Dec. 8, 1970   E. R. BRANDT   3,545,904
APPARATUS FOR SEQUENTIALLY SELECTING
PHOTOFLASH LAMPS FOR IGNITION
Filed Oct. 3, 1968
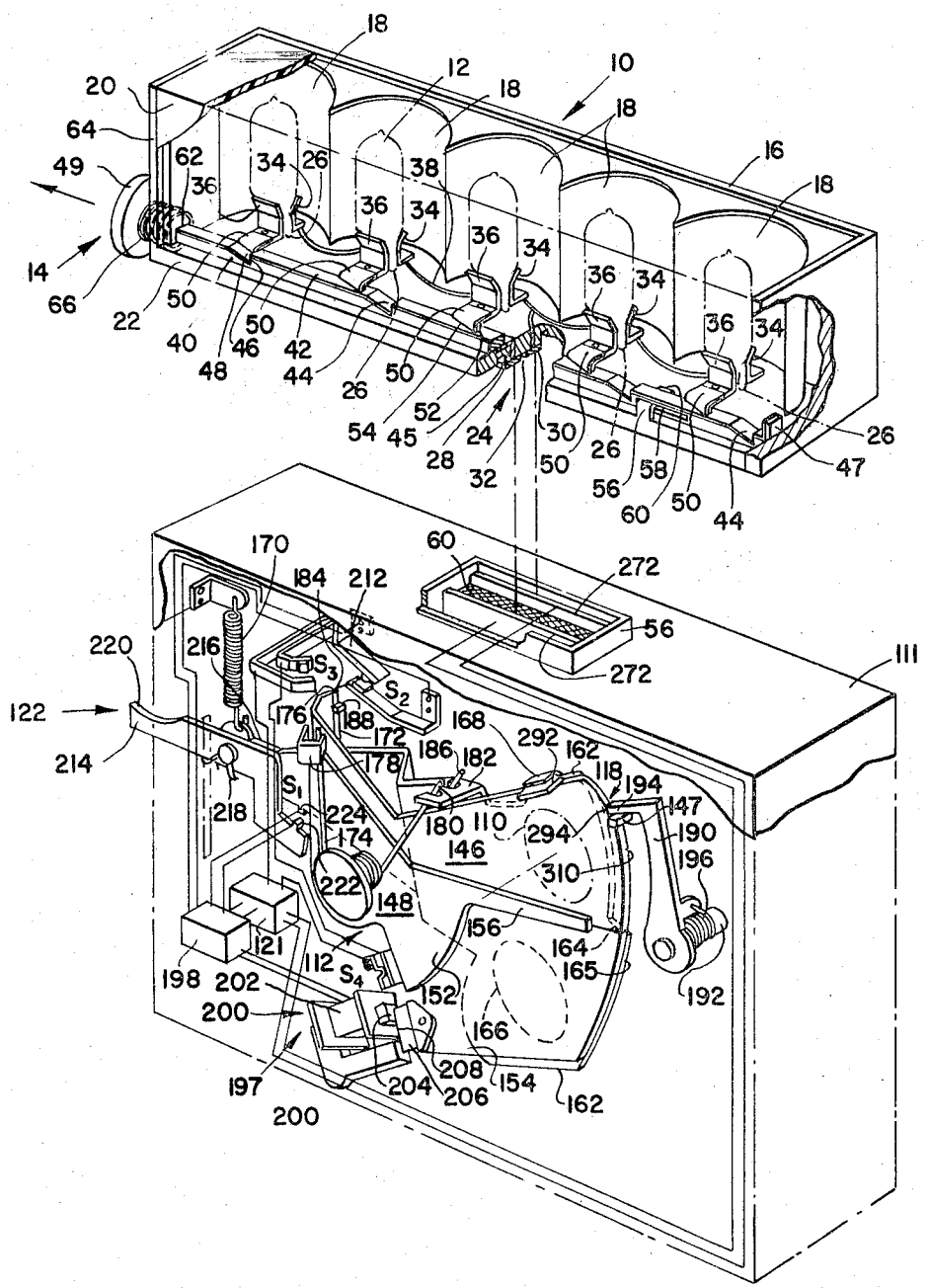
INVENTOR.
Edison R. Brandt
BY Brown and Mikulka
and
James L. Neal
ATTORNEYS

United States Patent Office 3,545,904
Patented Dec. 8, 1970

3,545,904
APPARATUS FOR SEQUENTIALLY SELECTING PHOTOFLASH LAMPS FOR IGNITION
Edison R. Brandt, Cohasset, Mass., assignor to Polaroid Corporation, Cambridge, Mass., a corporation of Delaware
Filed Oct. 3, 1968, Ser. No. 764,814
Int. Cl. F21k 5/02
U.S. Cl. 431—95                    9 Claims

ABSTRACT OF THE DISCLOSURE

A photoflash lamp assembly supports a plurality of photoflash lamps for simultaneous direction toward a scene to be photographed and includes indexable electrical conductor means responsive to ignition of one lamp for selecting another lamp for subsequent ignition.

SUMMARY OF THE INVENTION

This invention involves a multilamp photoflash assembly usable with a photographic camera and an electrical circuit for discharging photoflash lamps connecting therein in timed relationship with exposure producing operation of the camera. The photoflash lamp assembly is connectable in the circuit as a unit and incorporates indexing means responsive to radiation resulting from ignition of one lamp for selecting another lamp for subsequent ignition.

Small, all-glass photoflash lamps have made possible various photoflash lamp assemblies containing a plurality of flash lamps for ignition one at a time in synchronization with exposure producing operation of a camera. The structure of this invention provides a reusable stationary assembly which operatively supports a plurality of photoflash lamps for sequential ignition and an indexing system operable in response to the ignition of one lamp by the photoflash lamp ignition circuit for connecting a fresh lamp in the circuit.

It is a primary object of this invention to provide a reusable assembly for supporting a plurality of photoflash lamps for ignition one at a time in sequence in synchronization with successive exposure producing operations of a photographic camera.

It is a further object of this invention to provide an assembly for supporting a plurality of photoflash lamps and means for connecting the lamps in a photoflash lamp ignition circuit one at a time in sequence.

It is also an object of this invention to provide an assembly for supporting a plurality of photoflash lamps for simultaneous direction toward a scene to be photographed and including indexing means responsive to discharge of one lamp for connecting another lamp in a photoflash lamp discharge circuit.

BRIEF DESCRIPTION OF THE DRAWING

The single drawing figure is a partially cutaway perspective view showing a preferred embodiment of this invention in use with an exposure control system for a photographic camera.

DETAILED DESCRIPTION OF THE DRAWING

Photoflash lamp assembly 10 supports a plurality of small, all-glass photoflash lamps 12 for simultaneous direction toward a scene to be photographed and includes indexing means 14 for connecting the lamps in a photoflash lamp discharge circuit one at a time in sequence.

Referring to the drawing, in addition to indexing means 14, assembly 10 includes housing 16, a plurality of individual reflectors 18 in a linear array, transparent cover 20, molded plastic base 22, mounting means 24 and terminal means defining a plurality of lamp supporting terminal stations 26, one terminal station being located adjacent each reflector 18.

Base 22 supports mounting means 24 which releasably attaches assembly 10 upon a camera and electrically connects the assembly to a photoflash lamp ignition circuit. The terminal means includes electrically conductive terminals 28 and 30 separated by air gap 32. Terminals 28 and 30 are arranged for cooperation with terminals 272 of a photoflash lamp ignition circuit, which will subsequently be described.

Lamp supporting terminal stations 26 each include a terminal 34 and a terminal 36. Terminals 34 and 36 comprise sufficient inherent resilience to enable them to firmly frictionally engage the base of lamps 12 to provide an electrical connection between the lamps and the terminals and to frictionally retain the lamps in stations 26.

Terminals 34 are connected to each other and to terminal 30 of mounting means 24 by conductor means 38. Terminals 36 are connectable to terminal 28 of mounting means 24 one at a time in succession by indexing means 14.

Indexing means 14 includes elongated reciprocal conducting member 40 having button 49, stop 47 and insulating means 42 disposed along its upper surface. The insulating means is interrupted, forming engageable detents 44. The detents expose a portion of the conducting member and define a substantially vertical face 46 and a bevelled face 48. Conducting member 40 electrically connects with terminal 28 by means of wiping conductor 45.

Indexing means 14 also comprises electrically conductive bimetallic finger 50 having a downwardly directed pointed end defining vertical edge 52 and bevelled edge 54 which are complementary in configuration to detents 44 in conducting member 40. Elongated conducting member 40 is slidably mounted for movement between initial and final positions. Member 40 is attached to assembly 10 at one end by retaining member 56 which engages elongated slot 58 in member 40 and by cooperating post 60. The other end of member 20 is slidably retained by opening 62 in end portion 64 of housing 16. Member 40 is biased by spring means 66 for movement in the direction of the arrow and is movable in the direction opposite the arrow by manually pressing button 49. Detents 44 are spaced along the conducting member at equal intervals for cooperation with fingers 50. Fingers 50 are arranged along conducting member 40 in a linear array and are spaced apart by equal intervals, which intervals are smaller than the intervals spacing detents 44. The elongated conducting member is disposed beneath the downwardly directed pointed ends of fingers 50 so that these ends rest upon its upper, insulated surface. Since the spacing between detents 44 exceeds the spacing between fingers 50, fingers 50 are engageable with the detents one at a time.

Photographic exposure control apparatus illustrated for use with the flash lamp selecting apparatus of this invention includes means 110 supported by housing 111 and defining an exposure aperture, shutter 112, control means 114, drive means 116, latch means 118, retaining means 120, photoflash lamp ignition circuit 121, photoflash lamp assembly mounting means 119 and operating means 122.

Shutter 112 includes opening blade means 146 and closing blade means 148, each pivotally mounted upon hub 150 for aperture blocking and unblocking movement. The closing blade means includes support portion 152 and blade portion 154. The support portion is pivotally mounted upon hub 150 in overlying relationship to opening blade means 146. Blade portion 154 is mounted upon support portion 152 so that it lies in coplanar relationship with blade 146. In the position of FIG. 1, an edge of blade portion 154 abuts an edge of blade 146. Elongated portion 156 of support 152 forms a light seal along the abutting edges.

Control means 114 comprises a capping blade 162 pivotally mounted upon hub 150 for movement between first and second positions. The capping blade forms cam 164 and aperture 166 and supports abutment 168. The abutment extends into the path of movement of the opening blade means and, due to the abutting relationship of the opening and closing blades, limits counterclockwise movement of both of the opening and closing blades. Spring 170 continuously biases the capping blade in a clockwise direction toward its first position. When the capping blade is moved toward its first position, abutment 168 engages opening blade 146 and urges the opening blade and closing blade 148 clockwise toward their respective aperture blocking and unblocking positions. Retaining means 120 is positioned adjacent the aperture unblocking position of closing blade 148 for limiting clockwise motion. Since spring 170 continuously biases the control means in the clockwise direction, blade 148 is continuously and firmly pressed against the retaining means, for reasons which will hereafter be described.

Drive means 116 includes drive springs 172 and 174 for blade 146 and blade 148, respectively. Spring 174 is coiled about hub 150 and includes end portion 176 which extends outwardly from hub 150 and engages closing blade 148 at 178 and end portion 180 which extends outwardly from the hub and engages control means 114 at 182. Similiarly, spring 172 is coiled about the hub and includes end portions 184 and 186 which extend outwardly from the hub and engage opening blade 146 at 188 and control means 114 at 182, respectively. Drive spring 172 is preloaded to bias the opening blade for counterclockwise rotation about the hub while biasing the capping blade for clockwise rotation, thus biasing the opening blade against the abutment 168 of the capping blade. Similarly, spring 174 is preloaded to bias the closing blade for counterclockwise rotation about the hub while biasing the capping blade for clockwise rotation so that the closing blade is biased against the opening blade. All three of the above described blades may be moved together, as a unit, without influencing the condition of drive springs 172 and 174; the condition of the drive springs being affected only when there is relative motion between the blades. The preloaded condition of the springs serves to maintain the elements in their proper relative positions when the apparatus is in the rest position.

Latch means 118 releasably holds opening blade 146 in its aperture blocking position against the bias of spring 172. It includes arm 190 pivotally mounted upon pin 192, projection 194 extending from the end of arm 190 for releasably engaging an offset portion 147 of opening blade 146 and spring 196 for exerting a counterclockwise bias upon arm 190.

Retaining means 120 may comprise, for example, electrical control circuit means 198, electromechanical holding device 197 and switches $S_1$ and $S_2$.

One example of a control circuit suitable for use with retaining means 120 is disclosed in U.S. Pat. No. 3,326,103 which was issued to J. M. Topaz on June 20, 1967. The circuit includes a photoresponsive element, such as a cadmium sulfide photoconductor, arranged to receive light from the scene being photographed and having a resistance which is functionally related to the intensity of scene light. The timing operation of the circuit is responsive to the resistance value of the photoresponsive element.

The electromechanical holding device may involve an electromagnet including U-shaped core 200 and electrically energizable coil 202 wound around one leg of the core, coil 202 being included in circuit 198. The free ends, 204, of the core are coplanar and cooperable with magnetizable keeper 206 mounted upon closing blade means 148. The core of the electromagnet is positioned adjacent the aperture unblocking position of the closing blade means for contact with the keeper when the closing blade is in the aforesaid aperture unblocking position, the core and keeper being so arranged that surface 208 of the keeper contacts surfaces 204 of the U-shaped core to define a magnetic circuit. When the electromagnet is energized, a sufficient magnetomotive force is applied to the magnetic circuit to hold the keeper against the core and thus retain the closing blade in aperture unblocking position.

Switch $S_1$ is normally open and is closed to energize the timing circuit means by initial operation of operator means 122. Switch $S_2$ may include poles 210 and 212 wherein pole 210 is normally biased out of contact with pole 212 and adapted to be thrown into contact therewith when opening blade means 146 is in its initial position. Switch $S_2$ is operative in conjunction with timing circuit means 198 and coil 202 included therein, for controlling exposure interval duration.

Photoflash lamp ignition circuit 121 is provided and may be associated with control circuit 198. Circuit 121 incorporates, in a series, a pair of terminals 272; a flash ignition switch $S_3$ which when closed completes circuit 121 for igniting a flash lamp; and switch $S_4$ for opening circuit 121 while switch $S_3$ is closed. Switch $S_3$ is biased open and positioned to be closed by aperture unblocking movement of opening blade means 146. Switch $S_4$ is biased open and held closed by closing blade means 148 when the closing blade means is in its aperture unblocking position. When the closing blade means begins to move toward its aperture blocking position, switch $S_4$ opens according to its bias to open circuit 121.

Means 119 for mounting assembly 10 and electrically connecting it to flash lamp ignition circuit 121 may be of the type described in U.S. patent application Ser. No. 762,308 entitled, "Photographic Camera" and filed Sept. 16, 1968 in the name of Edison R. Brandt and bearing common assignment with the present application. Means 119 includes assembly aligning flange 56 which cooperates with groove 58 in base 20 of assembly 10 for aligning the assembly relative to housing 111 to thereby direct all lamps in the assembly toward the scene to be photographed when the assembly is mounted on the housing. Terminals 272 are configured as elongated bars and are spaced apart by electrically nonconductive magnet 60. In this manner, terminals 272 forming the poles of a permanent magnet, are electrically insulated from each other and are magnetically connectable with terminals 28 and 30 of assembly 10. When groove 58 of assembly 10 is aligned with flange 56 and terminals 28 and 30 are brought into contact with the pair of terminals 272, terminals 272 magnetically engage terminals 28 and 30 for securely holding the assembly upon housing 111 and for producing electrical connection between circuit 121 and assembly 10.

Operator 122 includes actuator lever 214 pivotally mounted to extension 216 of capping blade 162 and biased for counterclockwise movement about the pivotal mount by spring means 218. End 220 of lever 214 extends through a slot in a side of housing 111 for manual engagement. Terminals 222 and 224 of switch $S_1$ are mounted, respectively, upon actuator 214 and extension 216 for contact in response to initial movement of the actuator. Spring means 218 is substantially weaker than spring 70. Thereby, manual pressure applied to end 220 of lever 214 will first close switch $S_1$ and then impart movement to capping blade 162.

Operation of the above described preferred embodiment of this invention will now be described. Lamps are mounted in assembly 10 by swinging transparent cover away, in a manner not shown, to provide access to terminals 34 and 36. Lamp bases are pressed between the terminals until they are frictionally retained therein and electrical connection is made between terminals 34 and 36 and the terminals of lamps 12. The cover is closed and assembly 10 is mounted upon housing 111 in the manner described above. Button 49 is pressed to advance elongated conducting member 40 as far as it will go in the direction of the arrow, advancement being terminated by engagement between member 56 and the end of slot 58. Button 49 is released and spring means 66 moves member 40 a short distance in the direction of the arrow until a first detent 44 is engaged by a first bimetallic finger 50. Assembly 10 is thus held in a cocked position ready for sequential connection of the lamps in photoflash lamp ignition circuit 121. Engagement between the aforesaid first finger 50 and the aforesaid first detent 44 retains member 40 against movement and establishes electrical contact between a predetermined one lamp associated with the aforesaid first finger 50 and the flash lamp ignition circuit. Since the spacing between detents 44 exceeds the spacing between fingers 50, only this one lamp is connected in the photoflash lamp ignition circuit and, therefore, only this lamp is subject to be ignited in response to exposure producing operation of the camera. The remainder of the fingers 50 ride upon the insulated upper surface of elongated conducting member 40. The electrical circuit through the lamps of assembly 10 is established by terminal 28, wiping conductor 45, elongated conducting member 40, a finger 50, a terminal 36, the lamp 12 selected for ignition, a terminal 34, conductor means 38 and terminal 30.

To produce a photographic exposure, lever 214 is displaced downwardly to initiate exposure producing operation of the apparatus. Downward movement of the lever first closes switch $S_1$. Closure of switch $S_1$ energizes timing circuit 198 and coil 202 of an electromechanical holding device 197 to prevent forward movement of closing blade means 148 according to the bias of its drive spring, which movement would otherwise occur upon the subsequent movement of blade 146. Energization of the coil provides, in the magnetic circuit of core 200 and keeper 206, a magnetic induction sufficiently large to create a force on the keeper for holding the closing blade in its initial position against the bias of its drive spring independently of movement of opening blade 146.

Further downward movement of the lever effects counterclockwise movement of control means 114 from its first position toward its second position, against the bias of spring 170. Movement of the control means removes abutment means 168 from engagement with surface 292 of the opening blade. The opening blade moves slightly within its aperture blocking position to close gap 294, existing due to the previous retention of blade 146 by abutment means 168, and is releasably held in aperture blocking position by latch means 118.

Counterclockwise movement of control means 114, while movement of the opening and closing blades are arrested, "winds" drive springs 172 and 174 to store a predetermined amount of energy therein in addition to the energy stores therein due to the preloaded condition. Control means 114 ultimately reaches a position wherein cam surface 164 engages projection 194 of latch means 118. A further increment of movement carries the control means to its second position wherein it lies in unblocking relationship with the exposure aperture. The aforesaid further increment of movement causes cam surface 164 to move projection 194 clockwise, off opening blade 146, to release the opening blade for movement. Projection 194 continues to ride upon raised surface 165 of cam 164 and thereby prevents return movement of the latch under the influence of biasing spring 196.

The opening blade moves toward and to its aperture unblocking position, under the influence of drive spring 172, to initiate an exposure interval. During its movement, the opening blade opens switch $S_2$ to activate circuit means 198 to initiate the timing operation and then closes switch $S_3$ to complete the photoflash lamp ignition circuit, switch $S_4$ being held closed by blade 148. The single lamp connected in circuit 121 is ignited when switch $S_3$ is closed, ignition taking place in a predetermined timed relationship to the aforesaid aperture unblocking movement of the opening blade. Destruction of the lamp filament resulting from discharge of the lamp breaks the electrical connection between the contacts 34 and 36 associated with the discharged lamp thus opening circuit 121.

The timing operation initiated by opening of switch $S_2$ is completed a predetermined interval after initiation thereof in accordance with the operation of timing circuit 198. The completion of the timing operation de-energizes coil 202. Spring 174 acting on closing blade 148 then advances the closing blade toward and to its aperture blocking position to end the exposure interval. Initial movement of the closing blade permits $S_4$ to open according to its bias to thus open circuit 121. In its aperture blocking position, the closing blade abuts the opening blade and is biased into continuous contact therewith by spring 174.

Lamp selecting operation of assembly 10 takes place in response to thermal radiation resulting from discharge of a photoflash lamp. In the operation described above, thermal radiation from the discharged lamp heats bimetallic conductive finger 50 and causes it to deflect away from detent 44 in elongated conducting member 40, thus releasing member 40 for movement in the direction of the arrow under the influence of spring means 66. As member 40 moves, the previously engaged detent 44 moves away from the finger 50 which previously held it against movement and another detent 44 moves to a position beneath another finger 50 so that the other finger 50 engages and retains member 40 against movement and simultaneously establishes electrical connection between another lamp of the array and photoflash lamp ignition circuit 121. This lamp is then discharged in timed relationship to a subsequent exposure producing operation of the camera. In like manner, in response to discharge of each one of the lamps, another lamp is connected in circuit 121 until all the lamps have been successively discharged. When the last lamp has been discharged, the finger 50 responsive thereto raises to release member 40 for movement in the direction of the arrow but then engages stop 47 to limit movement of member 40. When members 50 cool after lifting from detents 44, they deflect back to a position along the upper surface of member 40. However, since member 40 has moved in the interval, fingers 50 rest on insulation 42 and, therefore, do not restrain movement of member 40 or establish an electrical connection therewith. The complementary shape of the downwardly directed ends of fingers 50 and detents 44 enable the detents to restrain movement of member 40 in the direction of the arrow by means of the abutment of vertical edge 52 of finger 50 with face 46 of the detents 44. Movement in the direction opposite the arrow is permitted due to cooperation between bevelled edges 54 of the fingers and bevelled surface 48 of the detents.

When all the lamps in assembly 10 have been discharged, the assembly may be lifted from the camera. Cover 20 is swung back, and the discharged lamps are manually removed and fresh lamps are installed, each lamp is properly oriented due to the shape of contacts 34 and 36. Button 49 is then pressed to return elongated conducting member 40 to its cocked position, against the action of spring means 66. The apparatus is thus reset to its operative condition wherein a plurality of lamps are arranged for simultaneous direction toward a scene to be photographed and are electrically connectable in a photoflash lamp ignition circuit for discharge one at a time in sequence.

In operation, the duration of the exposure interval is of a shorter period of time than that required of bimetallic conducting finger 50 to release elongated conducting member for movement and for member 40 to move the required distance to connect another lamp in the photoflash lamp ignition circuit. In this manner, a fresh lamp is not selected for ignition while circuit 121 remains closed after discharge of the previous lamp. For example, in the apparatus described above, the circuit is completed when opening blade 146 moves to its aperture unblocking position, while closing blade 148 is retained in its aperture unblocking position. The circuit is not opened until the closing blade is released and moves toward its aperture blocking position. Therefore, the apparatus must prevent connection of a fresh lamp in circuit 121 prior to initial movement of closing blade 148 from its aperture unblocking position. To effect this, circuit 198 limits the duration of exposure intervals during photography utilizing photoflash illumination to a predetermined length; for example, 34 milliseconds. Accordingly, bimetallic fingers 50 are calibrated to require a longer time; for example, 55 milliseconds, to move a sufficient distance in response to thermal radiation to lift downwardly directed ends entirely out of detents 44 to release member 40 for movement. Thereby, circuit 121 is opened after each exposure, prior to connection of a fresh flash lamp therein.

Since human reaction time involved in operating the apparatus described above substantially exceeds the longest average exposure apt to be used under normal "snapshot" conditions of scene brightness, the contacts of switch $S_1$ will be closed for at least as long as the correct exposure time.

It should be understood that the terms "up," "down," and the like are used in the foregoing disclosure to describe movement of various elements as seen in the figures and are not intended to be used in a limiting sense.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A photoflash assembly for use with photographic exposure control apparatus and an electrical circuit for discharging photoflash lamps in said circuit in timed relationship with photographic exposure production, said assembly comprising:
    (a) means for supporting a plurality of photoflash lamps for simultaneous direction toward a scene to be photographed;
    (b) a member advanceable between an initial and a final position and having a number of electrically conductive detents formed in cooperative association with an electrically insulative surface;
    (c) restraining means comprising a plurality of electrically conductive, thermal radiation responsive fingers engageable with said detents one at a time in sequence as said member is advanced from said initial to said final position, each finger being associated with a predetermined one of said lamps and engageable with a predetermined one of said detents for connecting the lamp with which said finger is associated in said circuit and for restraining movement of said advanceable means, each finger being biased for slidable engagement with said electrically insulative surface and for movement into connecting and restraining engagement with said predetermined one of said detents; and ,
    (d) means for biasing said advanceable member for movement from said initial to said final position, each said finger being engageable with its predetermined one detent as said advanceable member moves from said initial to said final position and being responsive to thermal radiation resulting from discharge of the one lamp with which it is associated for disengaging its predetermined one detent to permit movement of the advanceable member to a position wherein another finger engages another detent for connecting another lamp in said circuit and restraining further movement of said advanceable member.

2. The photoflash assembly of claim 1 wherein said radiation responsive fingers are formed as a bimetallic assembly.

3. A photoflash assembly electrically connectable to a photoflash lamp ignition circuit, said assembly comprising:
    means for supporting each one of an array of photoflash lamps in an orientation for illuminating a scene to be photographed;
    terminal means including electrically conductive radiation responsive latch means coupled with each one of said photoflash lamps for passing igniting current from a source of electrical energy through select ones of said flashlamps;
    an electrically conductive indexing member electrically coupled with said source of energy and movable from non-conducting contact into electrically conducting engagement with a select one of said latch means in response to the said radiation response of another one of said latch means to the ignition of one of said photoflash lamps.

4. A photoflash assembly according to claim 3 wherein said radiation responsive latch means comprises a number of restraining members corresponding to the number of lamps supportable by said supporting means, each of said restraining members being responsive to discharge of a predetermined one of said lamps for permitting one increment of movement of said indexing member.

5. The photoflash assembly of claim 3 wherein said radiation responsive latch means is resiliently biased for sliding contact with said indexing member.

6. The photoflash assembly of claim 5 in which said indexing member is formed having a predetermined number of electrically conductive detents configured and arranged thereon for establishing said electrically conducting engagement with said radiation responsive latch means.

7. The photoflash assembly of claim 6 in which said radiation responsive latch means is present as a bimetallic element.

8. The photoflash assembly of claim 6 in which said indexing member is formed having an electrically conductive first portion within which said detents are formed and an electrically insulative second portion arranged with said first portion to provide said sliding non-conducting contact.

9. The photoflash assembly of claim 8 including means for biasing said indexing member to move from said non-conducting contact into said electrically conducting engagement with said latch means.

References Cited

UNITED STATES PATENTS 3,443,875 5/1969 Herrmann _____ 431—95

FOREIGN PATENTS 1,103,682 2/1968 Great Britain _____ 431—95

OTHER REFERENCES 1,192,047, Apr. 29, 1965, German Auslegeschrift, Herrman, 431/95.

6702313, Netherlands Gevaert, 240/1.3.

EDWARD J. MICHAEL, Primary Examiner

U.S. Cl. X.R.

95—11.5; 240—1.3